(«12») United States Patent
Morita et al.

(10) Patent No.: US 9,946,117 B2
(45) Date of Patent: Apr. 17, 2018

(54) DISPLAY DEVICE

(71) Applicant: Japan Display Inc., Minato-ku (JP)

(72) Inventors: Yusuke Morita, Tokyo (JP); Nobuko Fukuoka, Tokyo (JP); Kazuya Daishi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 39 days.

(21) Appl. No.: 15/173,892

(22) Filed: Jun. 6, 2016

(65) Prior Publication Data

US 2017/0017101 A1    Jan. 19, 2017

(30) Foreign Application Priority Data

Jul. 16, 2015  (JP) ................................. 2015-142045

(51) Int. Cl.
*G02F 1/1339*  (2006.01)
(52) U.S. Cl.
CPC ........ *G02F 1/1339* (2013.01); *G02F 1/13394* (2013.01); *G02F 2001/13396* (2013.01)
(58) Field of Classification Search
CPC .................................................. G02F 1/1339
See application file for complete search history.

(56) References Cited

U.S. PATENT DOCUMENTS

| | | | |
|---|---|---|---|
| 2005/0023690 A1* | 2/2005 | Matsumura | H01L 21/76802 257/758 |
| 2008/0129946 A1* | 6/2008 | Chan | G02F 1/1339 349/153 |
| 2010/0007842 A1* | 1/2010 | Terao | G02F 1/1339 349/153 |
| 2010/0014042 A1* | 1/2010 | Komeno | G02F 1/1337 349/153 |
| 2011/0075090 A1* | 3/2011 | Shigekura | G02F 1/133351 349/153 |
| 2012/0194756 A1* | 8/2012 | Hayakawa | G02F 1/1339 349/43 |
| 2013/0128172 A1* | 5/2013 | Ochiai | G02F 1/136 349/43 |
| 2014/0063431 A1* | 3/2014 | Shih | G02F 1/1339 349/153 |
| 2014/0300848 A1* | 10/2014 | Mori | G02F 1/1339 349/106 |

(Continued)

FOREIGN PATENT DOCUMENTS

| | | | |
|---|---|---|---|
| JP | 2009-025355 | * | 2/2009 |
| JP | 2009-25355 | | 2/2009 |

*Primary Examiner* — Sang V Nguyen
(74) *Attorney, Agent, or Firm* — Oblon, McClelland, Maier & Neustadt, L.L.P.

(57) ABSTRACT

According to one embodiment, a display device includes a first substrate including a display area and a terminal area, a second substrate opposed to the display area, a first sealing member formed between the first and second substrate and surrounding the display area, a second sealing member formed between the first sealing member and a first edge of the second substrate located at the terminal area side, and a first spacer formed between the first and second sealing member and formed at least in contact with the second sealing member. The first spacer includes a first side surface at the second sealing member side and a second side surface at the first sealing member side, and the first side surface at least partly projects toward the first edge.

10 Claims, 9 Drawing Sheets

(56) References Cited

U.S. PATENT DOCUMENTS

| | | | |
|---|---|---|---|
| 2014/0307208 A1* | 10/2014 | Hatakeyama | G02F 1/13394 349/106 |
| 2015/0160497 A1* | 6/2015 | Sonoda | G02F 1/13394 349/153 |
| 2015/0185539 A1* | 7/2015 | Senokuchi | H05B 33/10 349/58 |
| 2016/0011445 A1* | 1/2016 | Chen | G02F 1/1337 349/110 |
| 2016/0116772 A1* | 4/2016 | Cha | G02F 1/1339 349/123 |
| 2016/0147097 A1* | 5/2016 | Makino | G02F 1/1339 349/33 |

* cited by examiner

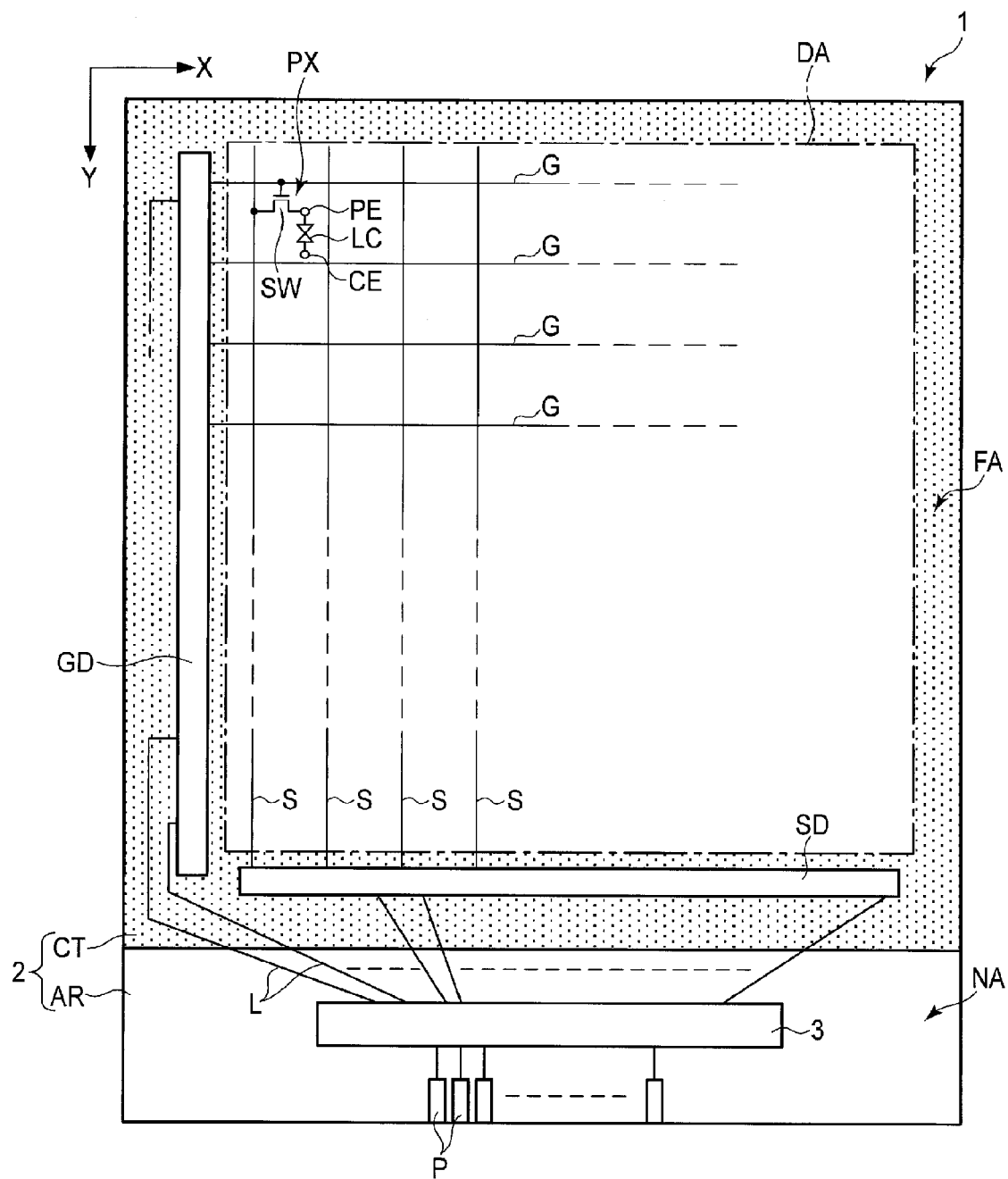
F I G. 1

DISPLAY DEVICE

CROSS-REFERENCE TO RELATED APPLICATIONS

This application is based upon and claims the benefit of priority from Japanese Patent Application No. 2015-142045, filed Jul. 16, 2015, the entire contents of which are incorporated herein by reference.

FIELD

Embodiments described herein relate generally to a display device.

BACKGROUND

For example, a liquid crystal display device comprising a first substrate, a second substrate opposed to the first substrate, and a liquid crystal layer interposed between the first substrate and the second substrate is used in various electronic devices. The liquid crystal layer is sealed between the first substrate and the second substrate with an annular sealing member.

The sealing member is formed in a non-display area (also referred to as a frame area) around a display area. Recently, there have been desires to narrow the non-display area, and thus various arrangement methods of the sealing member have been developed (for example, see patent literature 1).

However, depending on arrangement methods of the sealing member, the sealing member will break unexpectedly or will be displaced from a position to which the sealing member should be applied, and consequently the yield rate of the display device will decrease.

BRIEF DESCRIPTION OF THE DRAWINGS

FIG. 1 is a schematic plan of the structure of a display device of a first embodiment.

DETAILED DESCRIPTION

Figure 2:
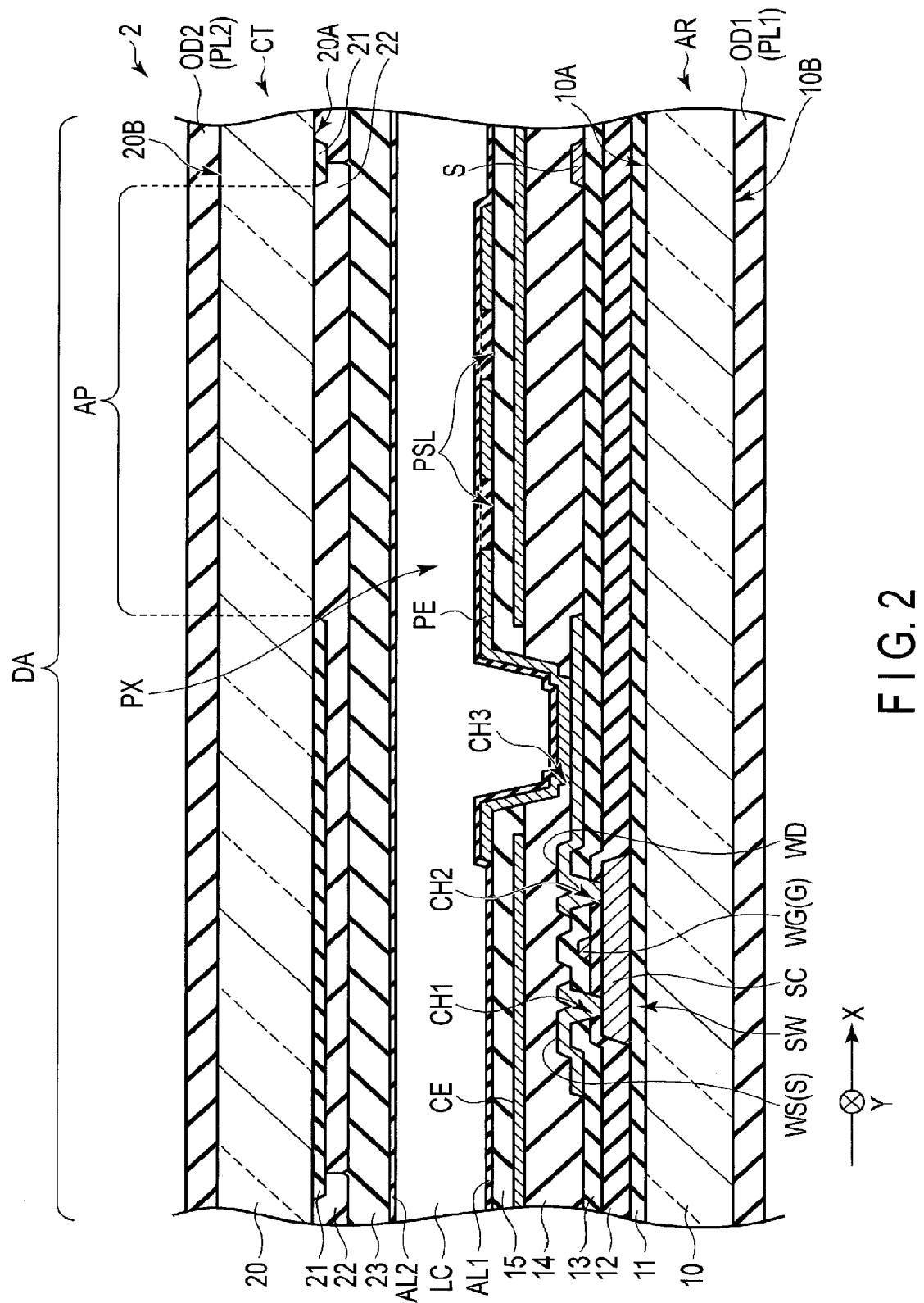
FIG. 2 is a schematic section of a display panel of the first embodiment.

In general, according to one embodiment, a display device comprises: a first substrate including a display area in which an image is displayed and a terminal area in which terminals are formed; a second substrate opposed to the display area of the first substrate and unopposed to the terminal area of the first substrate; a first sealing member formed between the first substrate and the second substrate and surrounding the display area; a second sealing member formed between the first sealing member and a first edge of the second substrate located at the terminal area side; and a first spacer formed between the first sealing member and the second sealing member and formed at least in contact with the second sealing member. The first spacer includes a first side surface at the second sealing member side and a second side surface at the first sealing member side, and the first side surface at least partly projects toward the first edge.

According to the above-described display device, problems associated with the sealing member can be prevented, and the yield rate of the display device can be improved.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, such schematic illustration is merely exemplary, and adds no restrictions to the interpretation of the invention. In the drawings, reference numbers of continuously arranged elements equivalent or similar to each other are omitted in some cases. In addition, in the specification and drawings, structural elements which function in the same or a similar manner as/to those described in connection with preceding drawings are denoted by like reference numbers, and a detailed description thereof is omitted unless otherwise necessary.

In the embodiments, as an example of the display device, a display device comprising a display panel using a liquid crystal display element will be described. However, the embodiments will not prevent the technical ideas disclosed in the embodiments from being applied to a display device using a display element other than the liquid crystal element. The display element other than the liquid crystal element includes, for example, an organic electroluminescent display element.

First Embodiment

The first embodiment will be described.

FIG. 1 is a schematic plan of the structure of a display device 1 of the present embodiment. The display device 1 comprises a display panel 2 including an array substrate AR (first substrate) and a counter-substrate CT (second substrate). In the example of FIG. 1, the array substrate AR is larger than the counter-substrate CT. The array substrate AR and the counter-substrate CT are attached to each other such that three sides of one substrate are neatly laid on three sides of the other substrate.

In an area where the array substrate AR and the counter-substrate CT overlap each other, the display panel 2 comprises a display area DA including pixels PX serving for image display and a peripheral area FA around the display area DA. Further, the display panel 2 comprises an unopposed area NA (terminal area) where the array substrate AR and the counter-substrate CT do not overlap each other. For example, a plurality of pixels PX corresponding to different colors constitute a single color-display pixel. There is a case where the pixel PX is referred to as a sub-pixel.

In the display area DA, the array substrate AR comprises a plurality of gate lines G extending along a first direction X and arranged along a second direction Y, and a plurality of source lines S extending along the second direction Y and arranged along the first direction X. Each pixel PX is defined by two adjacent source lines S and two adjacent gate lines G.

In each pixel PX, the array substrate AR comprises a switching element SW electrically connected to the gate line G and the source line S, and a pixel electrode PE electrically connected to the switching element SW. Between the pixel electrode PE and a common electrode CE provided across the plurality of pixels PX, the pixel electrode PE produces an electric field to drive the liquid crystal layer LC. The common electrode CE may be provided in either of the counter-substrate CT and the array substrate AR. The liquid crystal layer LC is enclosed between the array substrate AR and the counter-substrate CT.

Further, the array substrate AR comprises a gate driver GD electrically connected to each gate line G and a source driver SD electrically connected to each source line S. In the example of FIG. 1, the gate driver GD is provided in the peripheral area FA along one side of the display area DA extending along the second direction Y, while the source driver SD is provided in the peripheral area FA between the display area DA and the unopposed area NA. The gate driver GD and the source driver SD may be provided in the array substrate AR in another manner or may be provided outside the array substrate AR.

A driver IC 3 serving as a display driver is mounted on the unopposed area NA. The driver IC 3 is electrically connected to the gate driver GD and the source driver SD via a plurality of connection lines L.

Further, a plurality of connection terminals P electrically connected to the driver IC 3 are also formed in the unopposed area NA. To the connection terminals P, a flexible printed circuit which connects the display device 1 and the main board or the like of the electronic device equipped with the display device 1 is connected.

FIG. 2 is a schematic section of the display panel 2 in the display area DA. The array substrate AR comprises a first insulating substrate 10 such as a glass substrate. The first insulating substrate 10 comprises a first main surface 10A at the counter-substrate CT side and a second main surface 10B at the side opposite to the first main surface 10A. Further, the array substrate AR comprises, at the first main surface 10A side of the first insulating substrate 10, an undercoat layer 11, a first insulating layer 12, a second insulating layer 13, a third insulating layer 14, a fourth insulating layer 15, the above-described switching element SW, the above-described pixel electrode PE, the above-described common electrode CE, and a first alignment film AL1. Note that FIG. 2 shows a single-top-gate thin-film transistor as an example of the switching element SW. However, the switching element SW is not necessarily the above-described transistor but may be a double-gate transistor or a bottom-gate transistor.

The undercoat layer 11 covers the first main surface 10A of the first insulating substrate 10. The switching element SW comprises a semiconductor layer SC of polysilicon or the like, a gate electrode WG, a source electrode WS, and a drain electrode WD. The semiconductor layer SC is disposed on the undercoat layer 11.

The first insulating layer 12 covers the semiconductor SC and the undercoat layer 11. The gate electrode WG of the switching element SW is formed on the first insulating layer 12 and is opposed to the semiconductor layer SC. The gate electrode WG is electrically connected to the gate line G. The second insulating layer 13 covers the gate electrode WG and the first insulating layer 12.

The source electrode WS and the drain electrode WD of the switching element SW are formed on the second insulating layer 13. The source electrode WS is electrically connected to the source line S. The source electrode WS and the drain electrode WD are in contact with the semiconductor layer SC respectively thorough a first contact hole CH1 and a second contact hole CH2 which penetrate the first insulating layer 12 and the second insulating layer 13.

The third insulating layer 14 covers the switching element SW and the second insulating layer 13 and smoothes unevenness resulting from the switching element SW. The third insulating layer 14 is formed of, for example, an organic resin material and is also referred to as an organic planarization film. For example, the third insulating layer 14 has the greatest thickness among the elements formed at the first main surface 10A side of the first insulating substrate 10.

The common electrode CE is formed on the third insulating layer 14. The fourth insulating film 15 covers the common electrode CE and the third insulating layer 14.

The pixel electrode PE is formed on the fourth insulating layer 15 and is opposed to the common electrode CE. The pixel electrode PE is electrically connected to the drain electrode WD of the switching element SW via a third contact hole CH3 which penetrates the third insulating layer 14 and the fourth insulating layer 15. In the example shown in the drawing, the pixel electrode PE comprises one or more slits PSL. The common electrode CE and the pixel electrode PE are formed of, for example, a transparent conductive material such as indium-tin-oxide (ITO). The first alignment film AL1 covers the pixel electrode PE and the fourth insulating layer 15.

The counter-substrate CT comprises a second insulating substrate 20 such as a glass substrate. The second insulating substrate 20 comprises a first main surface 20A at the array substrate AR side and a second main surface 20B at the side opposite to the first main surface 20A. Further, the counter-substrate CT comprises, at the first main surface 20A side of the second insulating substrate 20, a light-blocking layer 21, a color filter 22, an overcoat layer 23, and a second alignment film AL2.

The light-blocking layer 21 is disposed on the first main surface 20A of the second insulating substrate 20. In the display area DA, the light-blocking layer 21 defines each pixel PX and forms an aperture area AP, and opposes an interconnect portion such as the gate line G, the source line S and the switching element SW provided in the array substrate AR.

The color filter 22 covers the aperture area AP and also extends on the light-blocking layer 21. The color filter 22 is formed of, for example, a color resist colored in accordance with the colors of the pixels PX. The overcoat layer 23 covers the color filter 22. The overcoat layer 23 smoothes unevenness of the surface of light-blocking layer 21 and the surface of the color filter 22. The second alignment film AL2 covers the overcoat layer 23.

The liquid crystal layer LC including liquid crystal molecules is formed between the first alignment film AL1 and the second alignment film AL2. A first optical element OD1 including a first polarizer PL1 is disposed on the second main surface 10B of the first insulating substrate 10. Further, a second optical element OD2 including a second polarizer PL2 is disposed on the second main surface 20B of the second insulating substrate 20. The first polarization axis of the first polarizer PL1 and the second polarization axis of the second polarizer PL2 are, for example, orthogonal to each other as in a crossed-Nicol relationship.

In the example of the drawing, the display panel 2 is adaptable to an in-plane switching (IPS) mode or a fringe field switching (FFS) mode, and the pixel electrode PE and the common electrode CE are provided in the array substrate AR. The display panel 2 may also be adaptable to another mode, for example, in which the common electrode CE is provided in the counter-substrate CT.

The array substrate AR and the counter-substrate CT are attached to each other by a sealing member formed therebetween. The sealing member will be described below.

Figure 3:
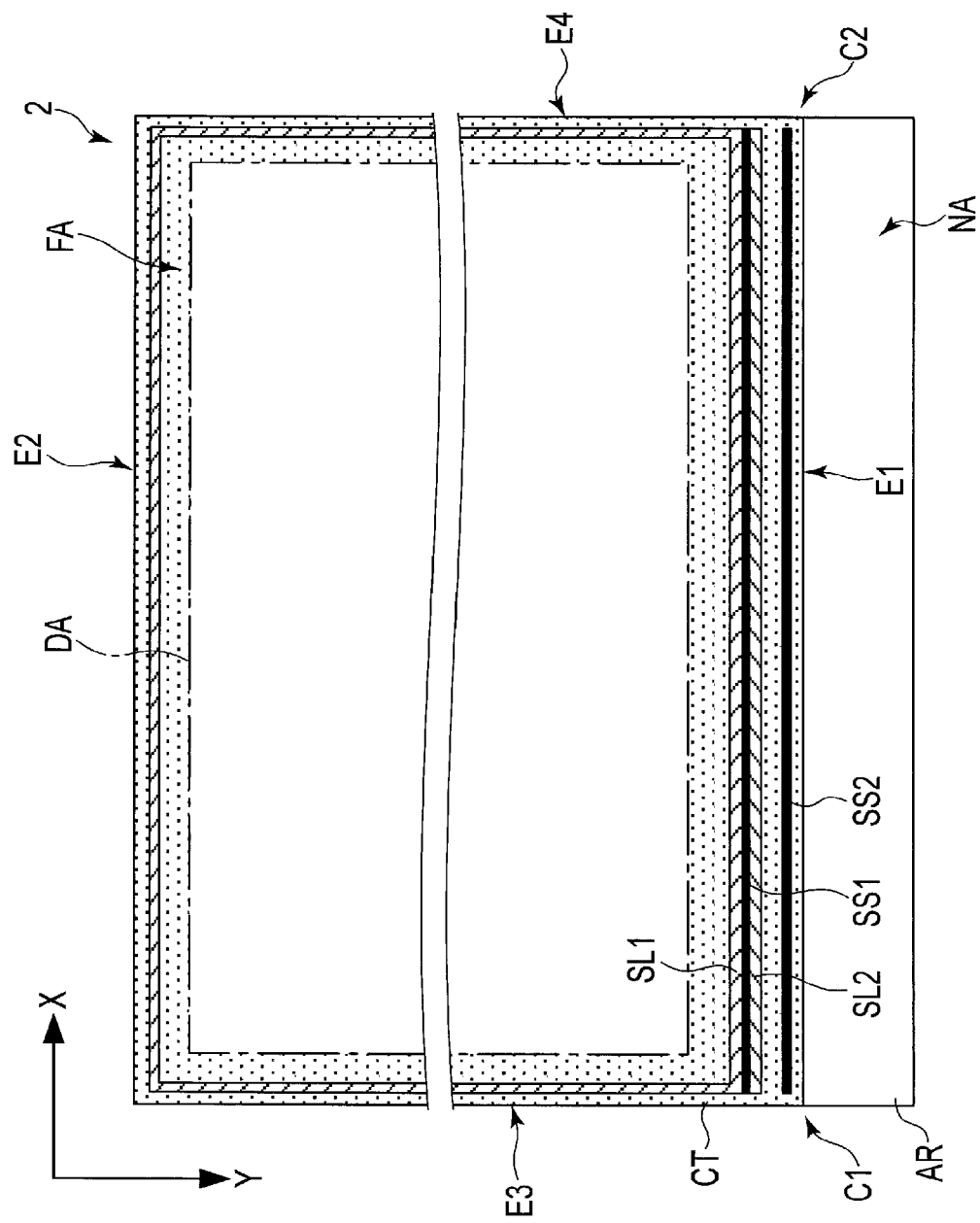
FIG. 3 is a schematic showing the arrangement of a sealing member of the first embodiment.

FIG. 3 is a schematic showing the arrangement of the sealing member. The following description is based on the assumption that, as shown in the drawing, an edge of the counter-substrate CT at the unopposed area NA side is a first edge E1, an edge opposite to the first edge E1 is a second edge E2, an edge connecting the first edge E1 and the second edge E2 is a third edge E3, and an edge opposite to the third edge E3 and connecting the first edge E1 and the second edge E2 is a fourth edge E4, and that a corner between the first edge E1 and the third edge E3 is a first corner C1, and a corner between the first edge E1 and the fourth edge 4 is a second corner C2.

In the present embodiment, a first sealing member SL1 and a second sealing member SL2 are formed in the peripheral area FA. The first sealing member SL1 surrounds the display area DA. The liquid crystal layer LC is enclosed inside the annular first sealing member SL1.

The second sealing member SL2 is formed between the first sealing member SL1 and the first edge E1 and extends parallel to the first direction X. It is possible, by providing the second sealing member SL2, to improve the adhesion of the array substrate AR to the counter-substrate CT in the vicinity of the unopposed NA and to thereby prevent problems such as detachment.

In the peripheral area FA, a first spacer SS1 and a second spacer SS2 are formed between the array substrate AR and the counter-substrate CT. The first spacer SS1 is formed between the first sealing member SL1 and the second sealing member SL2 and extends parallel to the first direction X. The second spacer SS2 is formed between the second sealing member SL2 and the first edge E1 and extends parallel to the first direction X. It is possible to accurately form the first sealing member SL1 and the second sealing member SL2 by providing the first spacer SS1.

In the example of FIG. 3, all of the second sealing member SL2, the first spacer SS1 and the second spacer SS2 are formed between the display area DA and the first edge E1. However, the second sealing member SL2, the first spacer SS1 and the second spacer SS2 may also be arranged along the third edge E3 and the fourth edge E4 of the counter-substrate CT.

Figure 4:
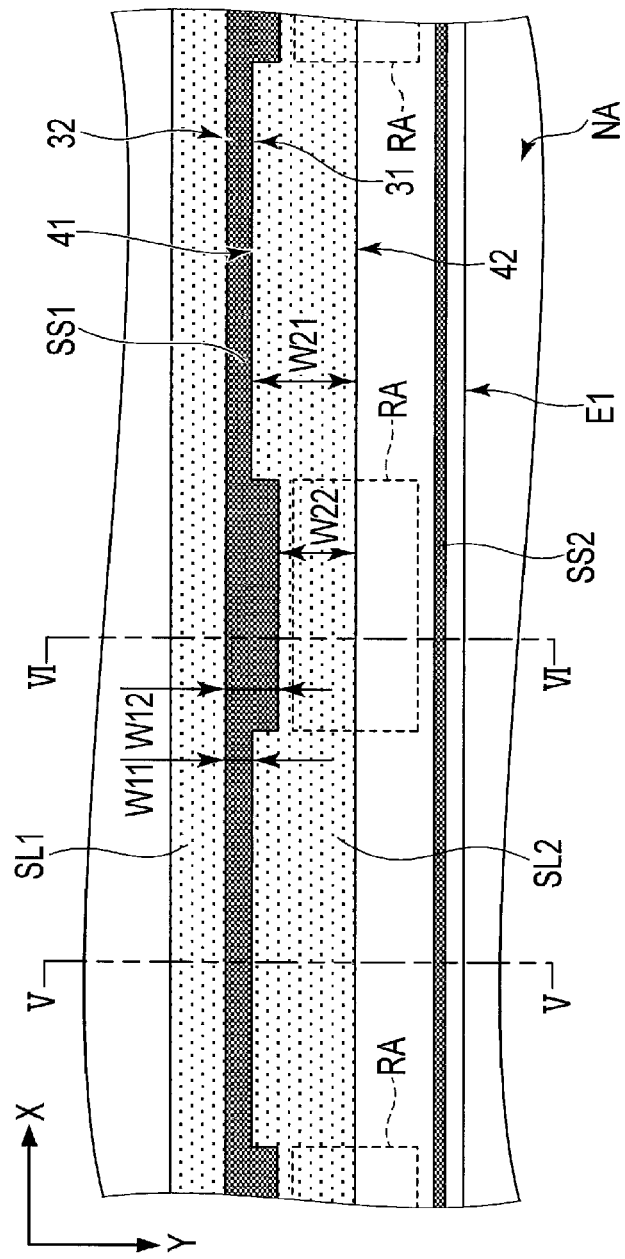
FIG. 4 is an enlarged view of the vicinity of a first edge of a counter-substrate of the first embodiment.

FIG. 4 is an enlarged view of the vicinity of the first edge E1 of the counter-substrate CT. The third insulating layer 14 of FIG. 2 is partly removed in a position where it overlaps the second seal member SL2. In the example of FIG. 4, the area circled with a broken line corresponds to a removed area RA where the third insulating layer 14 is removed.

The width of the first spacer SS1 varies according to the location in the first direction X. More specifically, a first side surface 31 (lower side surface in the drawing) of the first spacer SS1 at the unopposed area NA side locally projects toward the removed area RA and the first edge E1, and thus the width of the first spacer SS1 varies between a width (first width) W11 and a width (second width) W12. The second width W12 is greater than the first width W11 (W11<W12).

The second sealing member SL2 is in contact with the first spacer SS1. In the example of FIG. 4, the first sealing member SL1 is also in contact with the first spacer SS1, but the first sealing member SL1 may also be separated from the first spacer SS1.

The width of the second sealing member SL2 varies according to the width of the first spacer SS1. More specifically, the shape of a first side surface 41 (upper side surface in the drawing) of the second sealing member SL2 at the display area DA side varies according to the shape of the first spacer SS1, and thus the width of the second sealing member SL2 varies between a width (third width) W21 and a width (fourth width) W22. The fourth width W22 is less than the third width W21 (W21>W22).

Note that, in the example of FIG. 4, the first side surface 31 of the first spacer SS1 and the first side surface 41 of the second spacer SS2 project at a substantially right angle in the vicinity of the removed area RA. However, the first side surfaces 31 and 41 may project gradually at an angle other than the right angle, for example, at an acute angle, or may also be a curved surface.

In the example of FIG. 4, a second side surface 32 (upper side surface in the drawing) of the first spacer SS1 at the display area DA side and a second side surface 42 (lower side surface in the drawing) of the second sealing member SL2 at the unopposed area NA side are over all even and parallel to the first direction X. In this case, the sum of the first width 11 and the third width 21 is almost the same as the sum of the second width W12 and the fourth width 22.

Note that the shape of the second side surface 32 of the first spacer SS1 may also vary according to the location. Further, the second side surface 42 of the second sealing member SL2 is not necessarily entirely even but may have some recesses and projections according to the shape of the first spacer SS1.

The second spacer SS2 is linearly formed along the first edge E1. In the manufacturing process of the display panel 2, the second spacer SS2 assists in cutting along a cutting line (that is, the first edge E1) of the counter-substrate CT formed on a mother glass.

Figure 5:
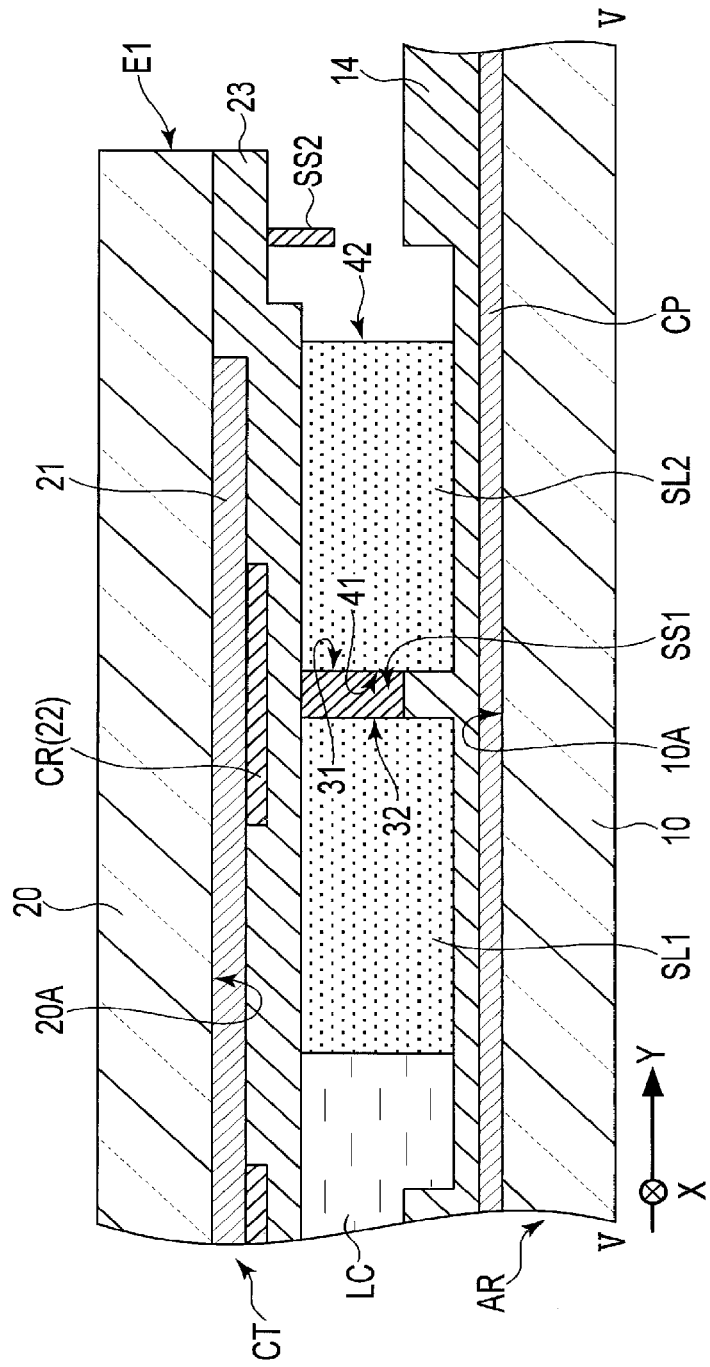
FIG. 5 is a schematic section along line V-V of FIG. 4.

FIG. 5 is a schematic section along line V-V of FIG. 4. In the drawing, some elements of FIG. 2 are omitted.

A circuit portion CP is formed on the first main surface 10A of the first insulating substrate 10. For example, the circuit portion CP includes a logic circuit constituting the connection lines L and the source driver SD of FIG. 1 and is formed simultaneously with the switching element SW in the manufacturing process of the switching element SW. In a case where the display device 1 is configured to perform the touch detection function of detecting an object in proximity to the display area DA, the circuit portion CP may further comprise an interconnect or a logic circuit related to the touch detection function. In FIG. 5, the circuit portion CP is directly deposited on the first main surface 10A of the first insulating substrate 10, but the undercoat layer 11 and the like may be interposed between the circuit portion CP and the first main surface 10A.

The circuit portion CP is covered with the third insulating layer 14. It is possible to prevent corrosion and the like of the circuit portion CP in this way. Since line V-V of FIG. 4 does not cross the removed area RA, in FIG. 5, the circuit portion CP and the third insulating layer 14 are continuously formed on the first main surface 10A.

The first spacer SS1 and the second spacer SS2 are formed on the counter-substrate CT, more specifically, on the overcoat layer 23 in the example of the drawing. The edge (lower edge in the drawing) of the first spacer SS1 is in contact with the third insulating layer 14. In contrast, the edge (lower edge in the drawing) of the second spacer SS2 is not in contact with the third insulating layer 14 and the like.

The thickness of the third insulating layer 14 in a position where the first sealing member SL1 and the second sealing member SL2 are formed is less than that of the other portion. However, in a position where the first spacer SS1 is formed, the thickness of the third insulating layer 14 is substantially the same as that of the other portion in the display area DA or the like.

The light-blocking layer 21 extends from the display area DA side to the extent that the light-blocking layer 21 is at least opposed to the first spacer SS1. Further, a color resist CR, which is opposed to the first spacer SS1, is formed on the light-blocking layer 21. The color resist CR is formed simultaneously with the color filter 22 of FIG. 2 in the same manufacturing process and is, for example, a blue resist. For example, the color resist CR adjusts the height of the first spacer SS1.

Figure 6:
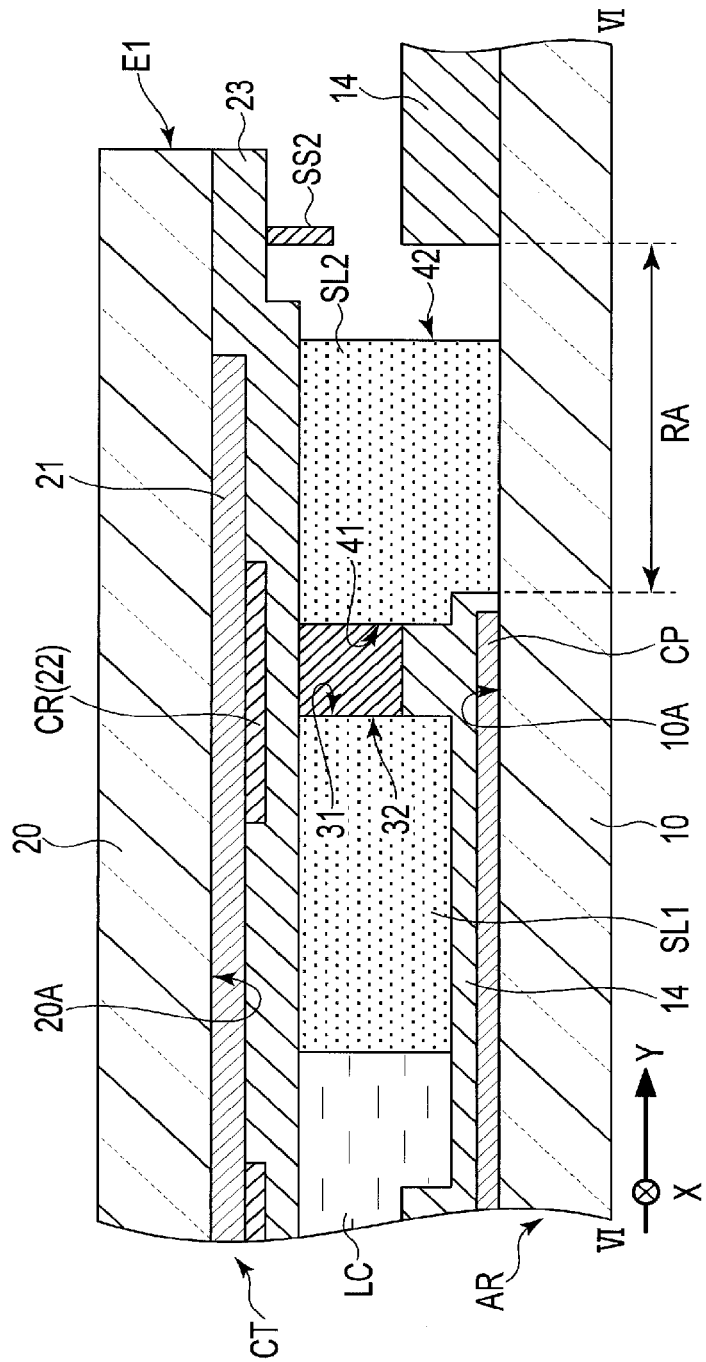
FIG. 6 is a schematic section along line VI-VI of FIG. 4.

FIG. 6 is a schematic section along line VI-VI of FIG. 4. In the drawing, as in the case of FIG. 5, some elements of FIG. 2 are omitted. Since line VI-VI of FIG. 4 crosses the removed area RA, in FIG. 6, the third insulating layer 14 is absent in a position where the second sealing member SL2 is formed.

In the present embodiment, the removed area RA is formed in an area where the circuit portion CP is absent. Therefore, in FIG. 6, the second sealing member SL2 is in contact with the first main surface 10A of the first insulating substrate 10. Note that the undercoat layer 11 and the like may be interposed between the second sealing member SL2 and the first main surface 10A.

For example, assuming that the first insulating substrate 10 is a glass substrate and the third insulating layer 14 is an organic resin layer, the adhesiveness of the second sealing member SL2 to the first main surface 10A is greater than the adhesiveness of the second sealing member SL2 to the third insulating layer 14. Therefore, it is possible, by forming the removed area RA, to enhance the adhesiveness of the second sealing member SL2 to the array substrate AR and the counter-substrate CT.

In the manufacturing process of the display panel 2, the first sealing member SL1 and the second sealing member SL2 are applied to (drawn on) the counter-substrate CT formed on the mother glass by a dispenser. The amounts of the first sealing member SL1 and the second sealing member SL2 ejected from the dispenser per unit time are constant. Therefore, the second sealing member SL2 (for example, the second sealing member SL2 of FIGS. 5 and 6) has an almost uniform cross-sectional area.

The third insulating layer 14 is absent in the removed area RA. Therefore, if the width of the first spacer SS1 is uniform, the position of the second side surface 42 of the second sealing member SL2 will vary between the removed area RA and the area other than the removed area RA. However, in the present embodiment, the first side surface 31 of the first spacer SS1 projects toward the second sealing member SL2 in the removed area RA. Therefore, as compared to a case where the first spacer SS1 has a uniform width, the displacement of the second side surface 42 of the sealing member SL2 can be suppressed.

For example, it is possible to make the overall second side surface 42 of the second sealing member SL2 substantially even as shown in FIG. 4 by appropriately adjusting the shape of the removed area RA and the shape of the first side surface 31 of the first spacer SS1.

Figure 7:
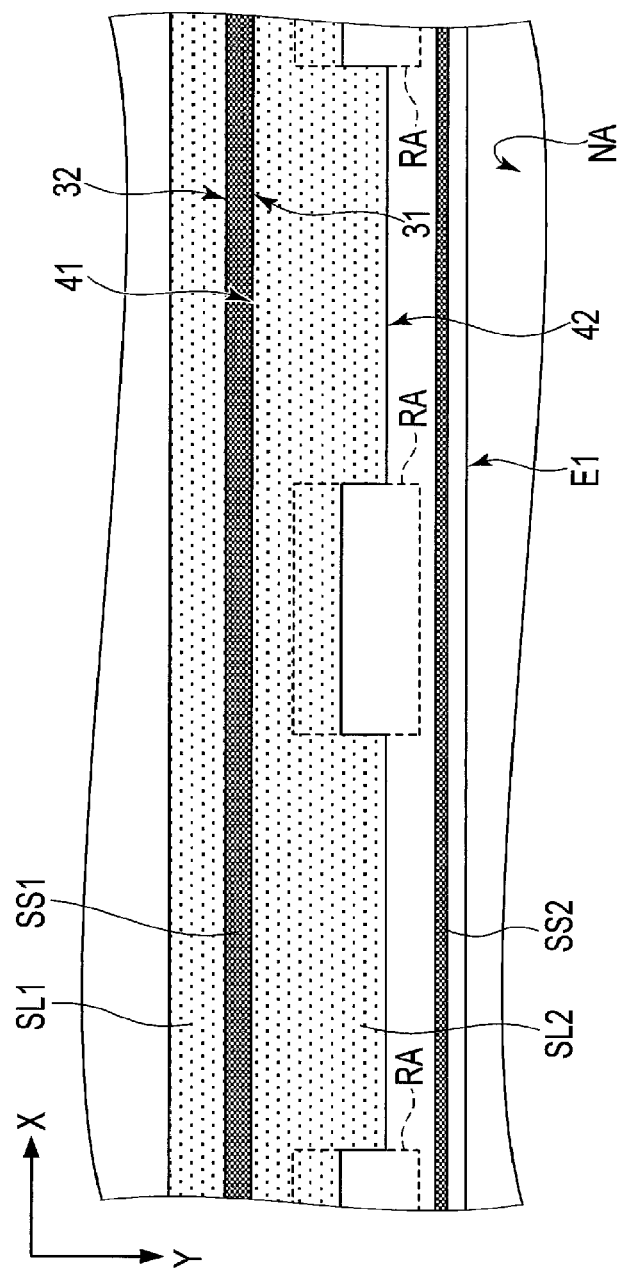
FIG. 7 is a schematic of a comparative example of the first embodiment.

Here, a comparative example of the present embodiment will be described. FIG. 7 is a schematic section of the comparative example and is an enlarged view of the vicinity of the first edge E1 of the counter-substrate CT such as that of FIG. 4. In the comparative example, although there is a removed area RA in the third insulating layer 14 as in the case of FIG. 4, the width of the linear first spacer SS1 is uniform.

Since the amount of the second sealing member SL2 ejected from the dispenser per unit time is constant, the second side surface 42 of the second sealing member SL2 has a recess in a portion overlapping the removed area RA and has a projection in a portion other than the overlapping portion toward the first edge E1 of the counter-substrate CT. In this case, there is a risk of the second sealing member SL2 being squeezed out from the first edge E1 of the counter-substrate CT in the projecting portion of the second side surface 42. In contrast, in the case of applying less of the second sealing member SL2 and thereby narrowing the second sealing member SL2 to reduce the risk of its being squeezed out, there is also a risk of the second sealing member SL2 being broken in the recessed portion of the second side surface 42. As the peripheral area FA becomes narrower, server restrictions are imposed on design, and consequently the risk of the second sealing member SL2 being squeezed out or being broken increases.

In the present embodiment, since the width of the first spacer SS1 varies according to the removed area RA of the third insulating layer 14, the second side surface 42 of the second sealing member SL2 becomes almost even, and thus it is possible to reduce the possibility of the second sealing member SL2 being squeezed out from the first edge E1 or being broken. In this way, the yield rate of the display panel 2 or the display device 1 can be improved.

Along with the above advantages, various other advantages can be achieved by the present embodiment.

Second Embodiment

Now, the second embodiment will be described.

In the present embodiment, an example design applicable to the end portions of the first spacer SS1 and the second sealing member SL2 will be described. Unless otherwise specified, the present embodiment has the same structure as that of the first embodiment.

Figure 8:
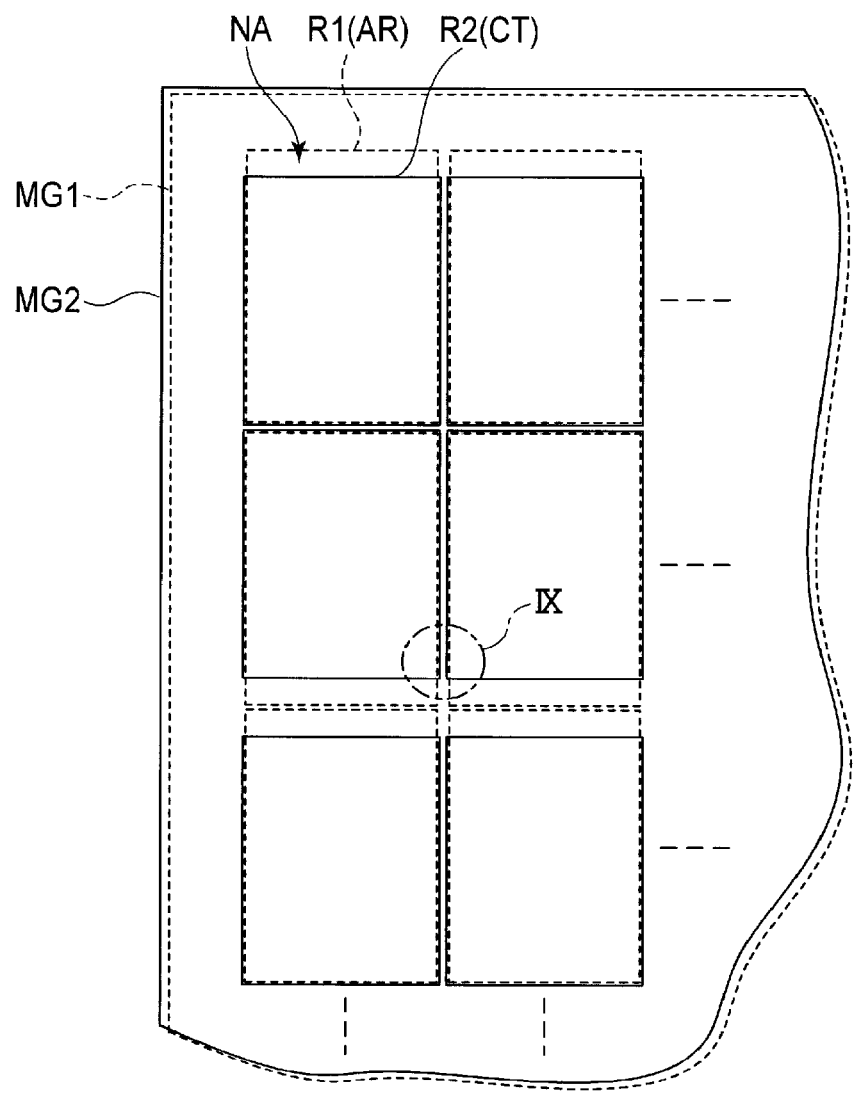
FIG. 8 is a schematic showing a manufacturing process of a display panel of a second embodiment.

FIG. 8 is a schematic showing a manufacturing process of the display panel 2. In the manufacturing process of the display panel 2, a first mother glass MG1 of the array substrate AR and a second mother glass MG2 of the counter-substrate CT are prepared. The first mother glass MG1 corresponds to the first insulating substrate 10 of FIG. 2 and comprises a plurality of first areas R1, each comprising various elements constituting a single array substrate AR. The second mother glass MG2 corresponds to the second insulating substrate 20 of FIG. 2 and comprises a plurality of second areas R1, each comprising various elements constituting a single counter-substrate CT. The first mother glass MG1 and the second mother glass MG2 are attached to each other by the first sealing member SL1 and the second sealing member SL2 formed respectively, for example, on the second mother glass MG2 such that the first areas R1 and the second areas R2 overlap each other.

In the example of FIG. 8, the display panel 2 in an odd-numbered line from the uppermost line comprises the first area R1 and the second area R2 including the portion corresponding to the unopposed area NA at the upper side in the drawing, while the display panel 2 in an even-numbered line from the uppermost line comprises the first area R1 and the second area R2 including the portion corresponding to the unopposed area NA at the lower side in the drawing.

Figure 9:
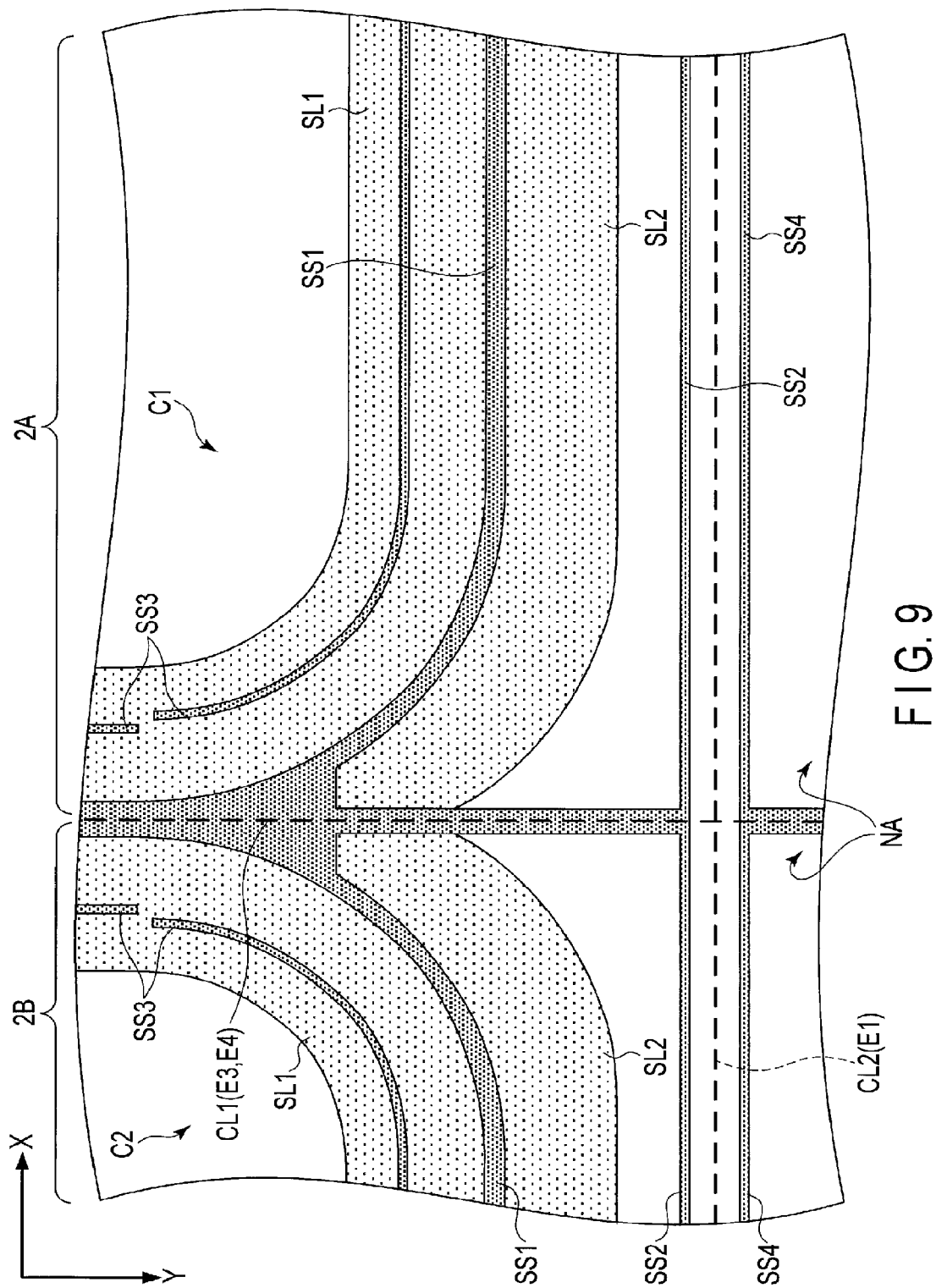
FIG. 9 is an enlarged schematic of part of the area circled with one-dot chain line IX in FIG. 8.

FIG. 9 is an enlarged schematic of part of the area circled with one-dot chain line IX of FIG. 8. In the drawing, the broken line extending along the second direction Y is a cutting line CL1 for cutting the display panel 2 off from the first mother glass MG1 and the second mother glass MG2. The first mother glass MG1 and the second mother glass MG2 will be cut along the cutting line CL1. In the following description, a display panel 2 formed on the right of the cutting line CL1 will be referred to as a display panel 2A and a display panel 2 formed on the left of the cutting line CL1 will be referred to as a display panel 2B.

In FIG. 9, a broken line extending along the first direction X is a cutting line CL2 for forming the unopposed areas NA in the display panels 2A and 2B. The second mother glass MG2 will be cut along the cutting line CL2.

The cut edge along the cutting line CL1 corresponds to the third edge E3 of the counter-substrate CT of the display panel 2A and also corresponds to the fourth edge E4 of the counter-substrate CT of the display panel 2B. The cut edge along the cutting line CL2 corresponds to the first edges E1 of the counter-substrates CT of the display panels 2A and 2B. That is, FIG. 9 shows the structure of the first corner C1 of the display panel 2A and the second corner C2 of the display panel 2B.

The first spacer SS1 of the display panel 2A curves gently toward the direction of the second edge E2 (upward in the drawing) in the first corner C1. The first spacer SS1 of the display panel 2B curves gently toward the direction of the second edge E2 in the second corner C2. The shape of the first spacer SS1 of the display panel 2A in the second corner C2 is the same as the shape of the first spacer SS1 of the display panel 2B in the second corner C2. Further, the shape of the first spacer SS1 of the display panel 2B is the same as the shape of the first spacer SS1 of the display panel 2A in the first corner C1.

In the example of FIG. 9, after curving toward the direction of the second edge E2, the first spacers SS1 of the display panels 2A and 2B join together in the portion overlapping the cutting line CL1 and then extend linearly along the cutting line CL1.

On the display panels 2A and 2B, both the first sealing members SL1 and the second sealing members SL2 curve along the first spacers SS1 in the first corner C1 and in the second corner C2.

Unlike the first spacers SS1, the second spacers SS2 of the display panels 2A and 2B do not curve but extend linearly up to the cutting line CL1. The second spacers SS2 of the display panels 2A and 2B join together in the portion overlapping the cutting line CL1 and then extend linearly along the cutting line CL1.

In the example of FIG. 9, each of the display panel 2A and the display panel 2B further comprises a third spacer SS3 and a fourth spacer SS4 in addition to the first spacer SS1 and the second spacer SS2. For example, the third spacer SS2 and the fourth spacer SS4 are formed in the counter-substrate CT in a manner similar to that of the first spacer SS1 and the second spacer SS2.

The third spacer SS3 is formed in a portion where the first sealing member SL1 is applied and is arranged along the first spacer SS1. On the display panels 2A and 2B, the third spacers SS3 curve along the first spacers SS1 in the first corner C1 and in the second corner C2. For example, the third spacer SS3 is disposed continuously or discontinuously around the display area DA and surrounds the display area DA.

The fourth spacer SS4 is disposed such that the fourth spacer SS4 sandwiches the cutting line CL2 together with the second spacer SS2. On the display panels 2A and 2B, the fourth spacers SS4 extend parallel to the cutting line CL2, join together in the portion overlapping the cutting line CL2, and then extend linearly along the cutting line CL1.

According to the present embodiment, the first spacers SS1 are formed also in the third edge E3 and the fourth edge E4 of the counter-substrate CT, and thus the first sealing members SL1 and the second sealing members SL2 can be applied more accurately in the first corner C1 and in the second corner C2. Further, the first spacers SS1, the first sealing members SL1 and the second sealing members SL2 are gently curved in the first corner C1 and in the second corner C2, and thus the sealing members will not be gathered or widened in the first corner C1 and in the second corner C2 but will remain in stable shapes regardless of positions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, each embodiment has been described based on the assumption that the first spacer SS1 and the second spacer SS2 are formed in the counter-substrate CT and that the first sealing member SL1 and the second sealing member SL2 are applied to the counter-substrate CT (or the second mother glass MG2). However, the first spacer SS1 and the second spacer SS2 may also be formed in the array substrate AR, and the first sealing member SL1 and the second sealing member SL2 may also be applied to the array substrate AR (or the first mother glass MG1).

Further, each embodiment has been described based on the assumption that the width of the first spacer SS1 and the width of the second spacer SS2 vary according to the removed area RA where the third insulating layer 14 is removed. However, the third insulating layer 14 may not be completely removed but may be slightly left in the portion corresponding to the removed area RA.

Still further, the thickness of the third insulating layer 14 may also vary in multiple steps in the portion overlapping the second sealing member SL2. In that case, the width of the first spacer SS1 may also vary in multiple steps according to the thickness of the third insulating layer 14.

Still further, the width of the first spacer SS1 and the width of the second sealing member SL2 may also vary based not only on the third insulating layer 14 but also on whether other layers such as the undercoat layer 11, the third insulating layer 12, the second insulating layer 13 and the fourth insulating layer 15 are removed or not.

Note that the term "spacer" used for the first spacer SS1 and the second spacer SS2 in the above description can be replaced with another term such as a structural object, a wall, a wall portion, a wall element and an embankment.

What is claimed is:
1. A display device comprising:
a first substrate including a display area in which switching elements are formed and a terminal area in which terminals are formed;
a second substrate opposed to the display area of the first substrate and unopposed to the terminal area of the first substrate;

a first sealing member formed between the first substrate and the second substrate and surrounding the display area;

a second sealing member formed between the first sealing member and a first edge of the second substrate located at the terminal area side; and a first spacer formed between the first sealing member and the second sealing member and formed at least in contact with the second sealing member, wherein the first spacer includes a first side surface at the second sealing member side and a second side surface at the first sealing member side, the switching elements are covered by an insulating layer which is formed to partly overlap the second sealing member, the first side surface projects toward the first edge in a region where the insulating layer is not formed, and the first spacer has a first width in proximity to where the second sealing member overlaps the insulating layer and has a second width in proximity to where the second sealing member does not overlap the insulating layer and the second width is greater than the first width.

2. The display device of claim 1, wherein the insulating layer is formed to overlap a circuit formed in the first substrate.

3. The display device of claim 2, wherein the insulating layer is removed where the circuit is not formed.

4. The display device of claim 1, wherein the width of the second sealing member varies between where the second sealing member does not overlap the insulating layer and where the second sealing member overlaps the insulating layer.

5. The display device of claim 1, further comprising a second spacer formed between the second sealing member and the first edge, wherein the first spacer is in contact with the insulating layer, and the second spacer is not in contact with the insulating layer.

6. The display device of claim 1, wherein the thickness of the insulating layer where the insulating layer overlaps the first sealing member or the second sealing member is less than the thickness of the insulating layer where the insulating layer overlaps the first spacer.

7. The display device of claim 1, wherein the first substrate comprises a first insulating substrate, wherein the second sealing member is in contact with the insulating layer where the second sealing member overlaps the insulating layer, and the second sealing member is in contact with the first insulating substrate where the second sealing member does not overlap the insulating layer.

8. The display device of claim 1, wherein the second substrate comprises a second edge opposite to the first edge, a third edge connecting the first edge and the second edge, and a fourth edge opposite to the third edge and connecting the first edge and the second edge, and the first spacer extends along the first edge, and curves toward the direction of the second edge in a first corner between the first edge and the third edge and in a second corner between the first edge and the fourth edge.

9. The display device of claim 8, wherein the second sealing member curves along the first spacer in the first corner and in the second corner.

10. The display device of claim 1, wherein the second sealing member has a third width corresponding to the first width and a fourth width corresponding to the second width, and the sum of the first width and the third width is the same as the sum of the second width and the fourth width.

* * * * *